United States Patent
Rotzler et al.

(10) Patent No.: US 7,787,966 B2
(45) Date of Patent: Aug. 31, 2010

(54) CONTROL DEVICE WITH BUS FOR OPERATING A MACHINE

(75) Inventors: Jürgen Rotzler, Steinen (DE); Thomas Grundmann, Rheinfelden (DE); Peter Heidecker, Steinen (DE)

(73) Assignee: Rotzler GmbH + Co. KG, Steinen (DE)

( * ) Notice: Subject to any disclaimer, the term of this patent is extended or adjusted under 35 U.S.C. 154(b) by 244 days.

(21) Appl. No.: 11/850,708

(22) Filed: Sep. 6, 2007

(65) Prior Publication Data
US 2008/0221726 A1    Sep. 11, 2008

(30) Foreign Application Priority Data
Sep. 6, 2006    (EP)    .................. 06018624

(51) Int. Cl.
*G05B 11/01*    (2006.01)
(52) U.S. Cl. .......................... 700/17; 700/21
(58) Field of Classification Search .................. 700/12, 700/14, 17, 21, 79, 83
See application file for complete search history.

(56) References Cited

U.S. PATENT DOCUMENTS

| 7,205,892 B2* | 4/2007 | Luebke et al. .......... 340/539.26 |
| 2003/0193475 A1 | 10/2003 | Rosenberg et al. |
| 2006/0059478 A1 | 3/2006 | Krajewski et al. |

FOREIGN PATENT DOCUMENTS

WO    2005103848 A1    11/2005

* cited by examiner

*Primary Examiner*—Albert DeCady
*Assistant Examiner*—Chad Rapp
(74) *Attorney, Agent, or Firm*—Gudrun E. Huckett

(57) ABSTRACT

A control device for operating a machine has a control unit with at least one actuating unit to which actuators and sensors are connected for operating the machine. The control unit has a bus line for transmitting control commands from an operating part to the actuating device. A plug connection between the operating part and the control unit is provided. A monitoring unit monitors an operating signal of the operating part. The monitoring unit triggers a safety function when the operating signal that is a heartbeat of the operating part is absent. Operating states of the operating part are monitored by the monitoring unit. An output signal of the monitoring unit is evaluated in that, when the operating part is switched on, the heartbeat is processed and, when the operating part is switched off, the absence of the heartbeat is ignored.

20 Claims, 2 Drawing Sheets

CONTROL DEVICE WITH BUS FOR OPERATING A MACHINE

BACKGROUND OF THE INVENTION

The invention relates to a control device for operating a machine, in particular, an industrial manufacturing facility, a conveying device, a crane, a cable winch device, a hoist or winch, or the like. The control device comprises actuators and/or sensors controlling the machine in operation which actuators and/or sensors are connected to an actuating unit of a control unit. The control device further has a bus line for transmitting control commands from an operating part to the actuating device. A plug connection between the operating part and the control unit as well as a monitoring device for an operating signal of the operating part are provided, wherein the monitoring device triggers a safety function when the operating signal is absent.

Such a control device comprises in general an operating part that is connected to a control unit in which at least one actuating unit is provided. For operating, for example, a winch, the actuating unit is connected to the actuators and/or sensors of the winch. A bus line is used to connect the operating part to the actuating unit. The actuating unit receives all control commands from the operating part via the bus line. The actuating unit processes appropriately the control commands, for example, by means of a processor and existing software applications, and actuates the actuators that are connected by drivers.

In modern control devices, the operating part is connected by means of a plug connection exchangeably to the control unit. In this way it is possible to control the machine from various locations.

The control unit comprises also a monitoring unit for an operating signal of a connected operating part in order to switch off the control unit when the operating signal is not received (is absent). After reconnecting the operating part to another port, the control unit must be restarted; this causes an undesirable work interruption.

SUMMARY OF THE INVENTION

It is an object of the present invention to configure a control device for operating a machine in such a way that an operating part can be exchanged without interruption of operation of the control unit.

In accordance with the present invention, this is achieved in that the operating signal is the heartbeat of the employed operating part, in that the operating state of the operating part is monitored by a monitoring unit, in that the output signal of the monitoring unit is evaluated wherein, when the operating part is switched on, the heartbeat is processed and, when the operating part is switched off, the absence of the heartbeat is ignored.

The operating signal indicating the operation of the operating part is the heartbeat of the connected operating part. In order to prevent that, as a result of the absence of the heartbeat of an operating part that has been removed, a shutdown of the control unit is initiated, the operating state of the operating part is monitored by a monitoring unit and the output signal of the monitoring unit is evaluated by the control unit. When the operating part is switched on, the heartbeat is processed by the control unit. When the operating part is switched off, the absence of the heartbeat signal is ignored. This is done advantageously by means of a processor of the actuating unit that, for this purpose, executes appropriate software applications.

For example, this provides the possibility that during operation of the machine a second operating part is removed, for example, and is reconnected at a different port of the control unit without, as a result of the absence of the heartbeat signal, the entire system being switched to safe mode, i.e., being no longer operative.

Advantageously, the monitoring unit monitors the current that is supplied to the operating part. When a predetermined threshold value is surpassed, the monitoring unit sends an output signal for the state "operating part switched on". When the current value drops below the threshold value, an output signal for the state "operating part switched off" is emitted. Expediently, the output signal for "operating part switched off" is an active signal, in particular, a digital voltage signal.

The employed operating signal for monitoring an operating unit is in particular the heartbeat signal of at least one terminal circuit board that is an interface between operating elements of the operating part, such as switches, switches, joysticks or the like, and the bus line. At least one terminal circuit board is present in an operating part; of course, several terminal circuit boards can be present also.

In order to obtain safety redundancy, it is provided that the operating part or several operating parts and the actuating unit or even several actuating units are integrated into a common circuit for a hardware emergency stop. Moreover, the operating part/parts and the actuating unit/units are integrated by the bus line in a common software emergency stop circuit.

In order to be able to remove an operating part from the control unit while it is continues to operate, the operating part is connected by means of a functional component to the control unit or the bus line and/or to a common circuit for a hardware emergency stop. For this purpose, the monitoring unit is expediently incorporated into the functional component wherein the functional component moreover has a switch for overriding the hardware emergency stop switch on the operating part. The override switch is monitored also and its actuation is preferably indicated by means of the bus line to the control unit. In this way, the proper function of the override switch can be monitored. This is done advantageously by means of a timing element that is started with actuation of the override switch. When after a predetermined period of time the override switch is not released, the control unit or the entire system is switched to safe mode as the timing period of the timing element has elapsed.

It is expedient to connect the functional component by means of a first plug connection to the control and to connect it by means of a second plug connection to the component part. The second plug connection is preferably provided with a positive-locking quick coupling.

The plug connections provide a connection to the bus line, the voltage supplied as well as the circuit of the hardware emergency stop.

The employed bus line (bus system) can be any suitable system. Preferably, a CAN bus (CAN=controller area network), particularly a CANopen bus, is employed.

DESCRIPTION OF THE PREFERRED EMBODIMENTS

Figure 1:
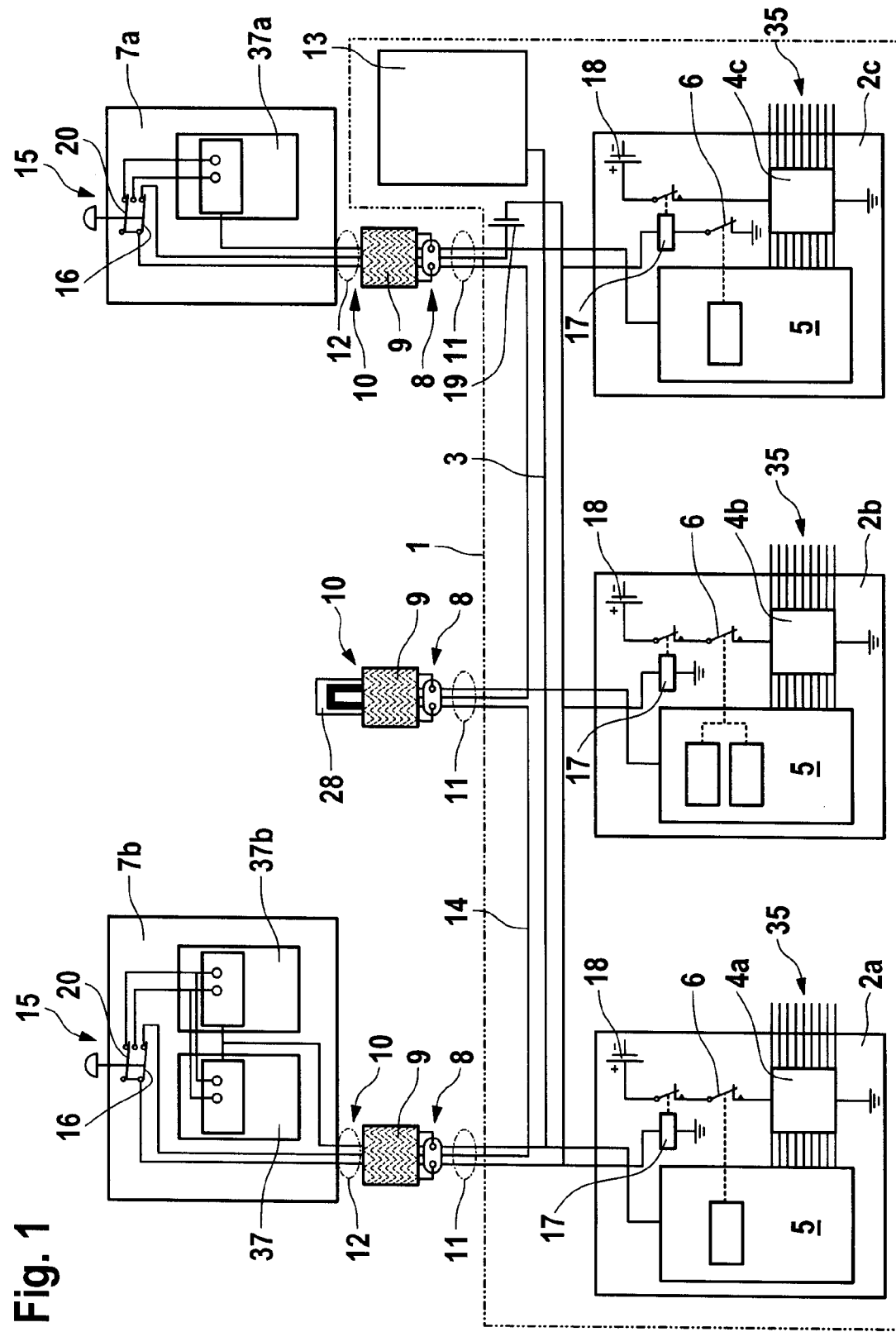
FIG. 1 shows a control device according to the invention in a schematic illustration.

FIG. 1 shows in a schematic illustration the configuration of a control device. Such a control device is comprised of the control unit 1 itself that serves for operating a machine and at least one operating part 7a, 7b by means of which the machine is controlled. The term machine is to be understood in particular as an industrial manufacturing facility, a cable winch device, a hoist or winch, for example, an anchor winch, a crane, a salvage, recovery or wrecking device, or the like.

The control unit 1 comprises at least one actuating unit 2a, 2b, 2c each connected to a plurality of actuators and/or sensors for safe operation of the machine. In the illustrated embodiment, three actuating units 2a, 2b, 2c are shown that each control a machine, respectively, by means of output drivers 4a, 4b, 4c and appropriate connecting lines 35. For example, the actuating unit 2a can be used to operate a winch, the actuating unit 2b can be used to operate a crane, and the actuating unit 2c can be used to operate a salvage device, for example, mounted on a vehicle (wrecker, tow truck).

The three actuating units 2a, 2b, 2c illustrated in the embodiment are connected by means of a bus line 3 with one another and with corresponding operating parts 7a, 7b. Each actuating device 2a, 2b, 2c is connected by means of an output driver 4a, 4b, 4c to corresponding actuators and/or sensors for operating the associated machine. This output driver is controlled by means of software applications that are executed in an electronic unit such as processor 5. Moreover, by means of an appropriate software application, it is also possible to actuate a switch 6 that, after evaluation of signals received through the bus line 3, is opened or closed (software emergency stop).

The bus line 3 illustrated in the embodiment is advantageously a CAN bus, in particular a CANopen bus. Other bus systems can also be advantageously utilized.

The operating part 7a, 7b connected to the control unit 1 has one or several terminal circuit boards 37, 37a, 37b by means of which control elements (not illustrated) such as switches, rotary regulators, joysticks or the like that are suitable as interfaces are connected. The operating parts 7a, 7b can be identical. In the illustrated embodiment, the part 7a shows a standard operating part 7a and the part 7b shows a special operating part by means of which, for example, additional functions can be actuated.

Figure 3:
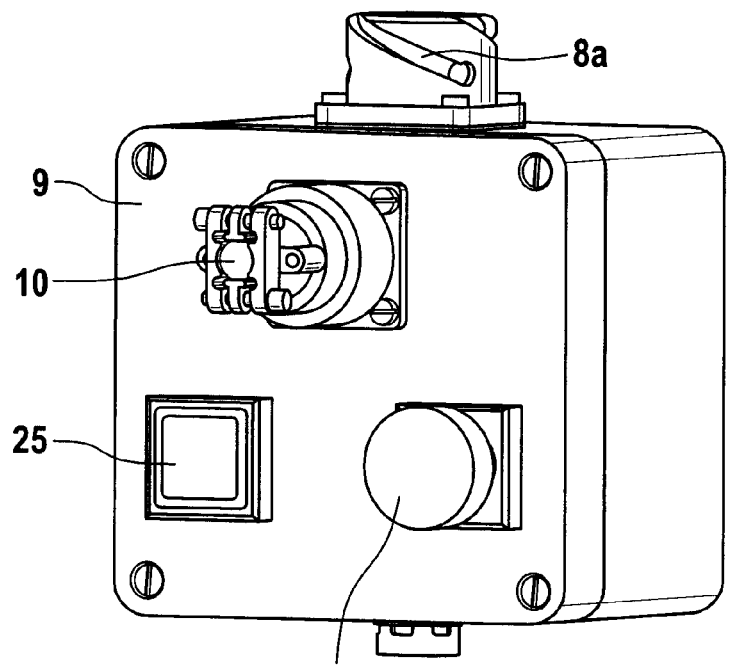
FIG. 3 shows a functional component mounted in a housing to be connected between the control device and an operating part.

The operating parts 7a, 7b are to be connected by plug connection 8 to the control unit 1 wherein, in accordance with the invention, between an operating part 7a, 7b and the plug connection 8 a functional component 9 is provided. As shown in FIG. 3, the functional component has a connector 8a for the plug connection 8 of the control unit 1 as well as a second plug connection 10 for connecting the operating part 7a, 7b.

The multi-wire cable 11 of the control unit 1 is essentially connected through the functional component and, wire by wire, connected to the proper terminals of the cable 12 of the operating part 7a, 7b.

The operating parts 7a, 7b, all actuating units 2a, 2b, 2c as well as a master control unit 13 of the bus system that is advantageously provided in the embodiment are integrated in a common hardware emergency stop circuit 14. Each component 7a, 7b has a mechanical emergency stop switch 15 whose break contact 16 is serially connected in the circuit 14. The circuit supplies voltage only when all break contacts 16 of existing emergency stop switches 15 are closed. When voltage is present in the emergency stop circuit 14, the all-or-nothing relays 17 of the actuating units 2a, 2b, and 2c are activated. The corresponding output drivers 4a, 4b, and 4c are connected to an operating voltage source 18 that is required for actuation of the connected actuators.

The hardware emergency stop circuit 14 is supplied with voltage from voltage source 19; supplied voltages of 12 V or 24 V are expedient.

Each emergency stop switch 15 of the operating parts 7a, 7b has, in addition to the break contact 16, a make contact 20 by means of which the actuation of the emergency stop switch 15 is transmitted to the bus 3. The control unit 1 recognizes thus based on software the actuation of the emergency stop switch 15. The signal that is triggered by closing or opening the make contact 20 when pushing down the switch 15 is supplied to the bus line 3, processed in a software application being processed within the processor 5, and the switch 6 is opened accordingly. The emergency stop system thus has redundance by existing in software as well as hardware. When one system is failing, the function of the emergency stop is still ensured by means of the other system.

In the actuating units 2a and 2b, the switch 6 is in serial connection to the make contact of the relay 17. It can also be advantageous to integrate in accordance with the actuating unit 2c, the switch 6 into the exciting circuit of the relay 17. When opening the switch 6, the relay 17 is deactivated and its make contact opens so that the voltage supply to the output driver 4c is interrupted.

Figure 2:
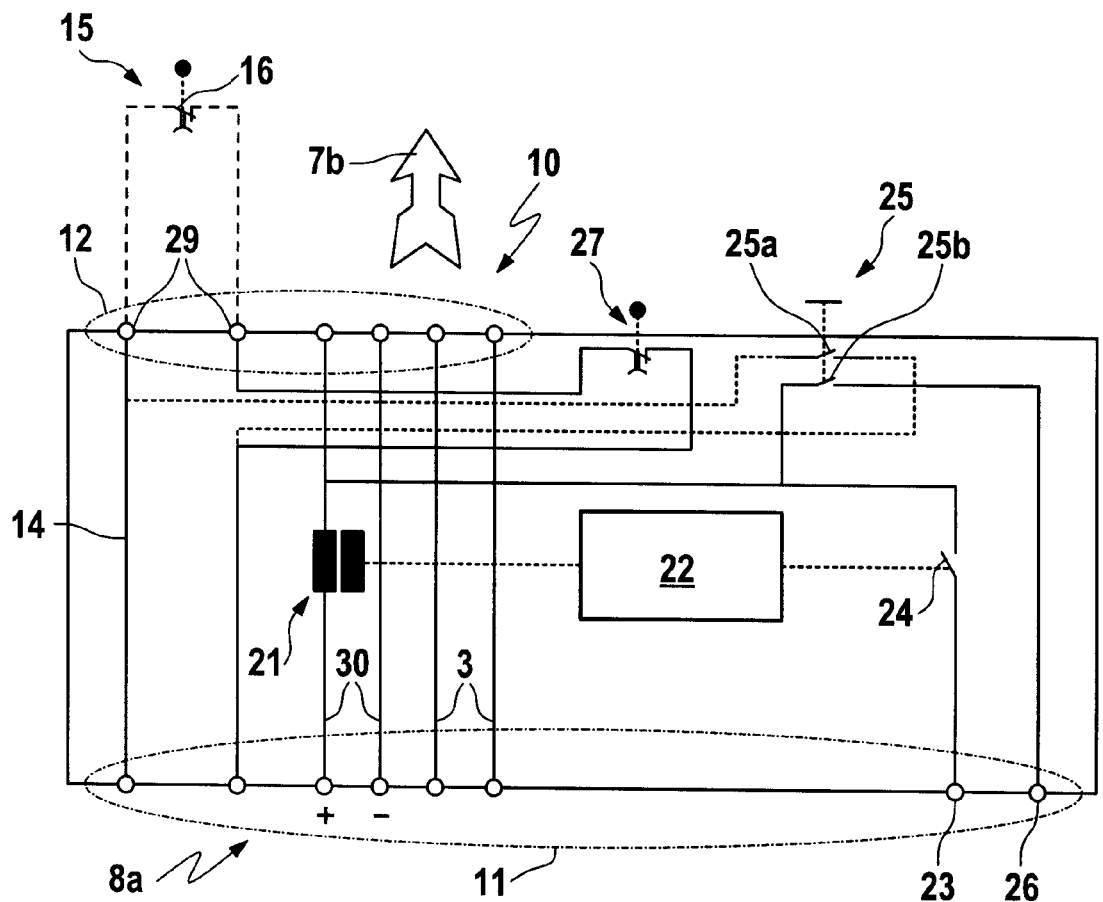
FIG. 2 is a circuit diagram of a functional component to be connected between an operating part and a control unit.

The functional component 9 that is plugged in like an intermediate plug between an operating part 7a, 7b and the control unit 1 has a circuit configuration as schematically shown in FIG. 2.

The CAN bus is electrically connected through from the plug connection 8 of the control unit 1 without additional function to the plug connection 10 of the operating part 7a, 7b. In the same way, voltage supply is connected through from the control unit 1 to the operating part 7a, 7b.

As shown in FIG. 2, one electric line of the voltage supply is provided with a current measuring element 21 by means of which the current flowing to the operating part is detected in an isolated way. In a monitoring unit, the output signal of the current measuring element 21 is evaluated. When the output signal surpasses a predetermined threshold value, the monitoring unit sends an output signal for the state "operating part switched on". When the current value drops below the threshold value, the monitoring unit 22 sends an output signal for the state "operating part switched off". In the illustrated embodiment of FIG. 2, a digital signal is output at pin 23. The digital signal can be set in the switched-off state of the operating part to "1" and in the switched-on state of the operating part to "0". In a simple way, by means of a switch 24 that is controlled by the monitoring unit the supply voltage 30 is connected through or not connected through to the pin 23 for this purpose.

The functional component 9 has moreover an override switch 25 that is parallel to the mechanical emergency stop switch 15 of the operating part 7a, 7b. The mechanical emergency stop switch 15 is comprised of two make contacts 25a, 25b wherein one make contact 25a is parallel to the break contact 16 of the mechanical emergency stop switch 15 of the operating part and the other make contact 2b connects the supply voltage 30 to an output pin 26. When the override switch 25 is pressed down, as a result of closing of the make contact 25a the mechanical emergency stop switch 15 of the operating part becomes inactive with regard to hardware emergency stop and, at the same time, as a result of closing of the make contact 25b the supply voltage 30 is connected to the output pin 26. When the override switch 25 opens, the mechanical emergency stop switch 15 of the connected operating part 7a, 7b is active again as a redundance and as a result of opening of the make contact 25b the output pin 26 is not connected to voltage. At the output pin 26 a digital signal is thus present which indicates the state of the override switch 25. This digital signal is set to "1" when the switch 25 is pressed down. When the switch 25 is open, the digital signal at the output pin 26 is "0".

It can be expedient to connect to the hardware circuit 14 of the emergency stop a further mechanical emergency stop switch 27 so that on the functional component 9 there is also an emergency stop switch 27 available for actuation by the operating personnel. This emergency stop switch 27 is active independent of whether an operating part 7a, 7b is plugged in or not. When no operating part is connected to the plug connection 8 of control unit 1 (FIG. 1—center), at the plug connection 10 a link 28 is plugged in that closes the hardware emergency stop circuit 14 in place of the switch 15. In this way, the hardware emergency stop is not triggered even though no operating part is inserted into the plug connection 8.

Each component 7a, 7b or the terminal circuit boards 37, 37a, 37b mounted within an operating part 7a, 7b send regularly a heartbeat signal that is supplied by the bus to all units of the control unit 1. Preferably, in all of the actuating units 2a, 2b, 2c integrated into the control unit 1 the received heartbeat signal is processed. When no heartbeat signal is received, the control unit 1 assumes that the corresponding terminal circuit board 37, 37a, 37b of an operating part 7a, 7b has failed. For safety reasons, each of the machines operated by an actuating unit is set to safe mode for which purpose, by means of the processor 5, for example, a corresponding software application is started and based on control signals sent by the software application the output drivers 4a, 4b, 4c and the actuators connected by means of lines 35 are actuated.

According to the invention, it is now provided that by means of a monitoring unit 22 the operating part 7a, 7b connected by plug connection 8 or 10 is monitored with regard to its operating state. As shown in FIG. 2, this can be done by monitoring the current flowing within the operating part 7a, 7b. In the illustrated embodiment, the operating part in the switched-off state receives a standby current of approximately 60 mA to 80 mA while in operation the current supply is approximately 140 mA to 180 mA. In this way, by setting a predetermined threshold value of, for example, 100 mA by means of the monitoring unit 22 it can be easily detected whether the operating part 7a, 7b connected to the functional component 9 is switched on or off.

When the connected operating part 7a, 7b is switched off by the operator, at the pin 23 a digital signal is present that indicates the state and that is supplied, for example, by means of bus line 3, to the actuating units 2a, 2b, and 2c. When the signal—operating part switched off—is present at the pin 23, the software application running in the processor 5 will not take this—and thus the absence of the heartbeat signal—as a trigger to transfer the control unit into safe mode. Accordingly, despite the deactivation of an operating component 7a, 7b, the control unit 1 can continue operation without malfunction and interruption.

By suppressing the evaluation of the heartbeat signal, there is the possibility to insert or remove an operating part 7a, 7b at the functional component 9 during operation of the control unit 1.

For example, when the operating part 7b is to be removed at the location of the functional component 9 and is to be inserted at a different location into another functional component 9, the following steps are carried out.

First, the operating part 7b to be removed is switched off. The monitoring unit 22 registers the switched-off state, closes the switch 24, and sends to the pin 23 a corresponding digital signal—operating part switched off—to the control unit 1. The individual actuating units 2a, 2b, 2c connected to the bus 3 recognize this signal and ignore the absence of a heartbeat of the operating part 7b. The control unit 1 remains in its active states.

Before the operating part 7b is removed from the plug connection 10, the override switch 25 is pressed down. In this way, the mechanical emergency stop switch 15 of the operating part 7b is overridden so that upon removal of the plug connection 10 no hardware emergency stop is triggered. During removal of the operating part 7b the switch 25 must remain pressed down.

After removal of the operating part 7b, a link 28 is pushed onto the plug connection 10 and bridges the open contacts 29 of the emergency stop switch 15 of the operating part 7b. Now the override switch 25 can be released again. The hardware emergency stop circuit 14 remains closed, and no hardware emergency stop is triggered.

In order to ensure that the override switch 25 cannot remain pressed down as a result of a malfunction or faulty operation, the control unit 1 is digitally notified of the switch 25 being pressed down by means of output pin 26. When the signal occurs at the output pin 26, in one or all actuating units 2a, 2b, 2c, or in a master control 13 that is advantageously provided, a timing element is started that is designed such that an operator has sufficient time for removing the operating part 7b and plugging in the link 28. When the predetermined period of time for removal of the operating part 7b and connecting the link 28 is surpassed, a software emergency stop is triggered by the control unit 1. All actuating units 2a, 2b, 2c of the control unit 1 are stopped; the machines are shut down.

The operating part 7b that has been separated from the control unit 1 can now be reconnected at a different location. This is, for example, expedient in the case of cranes, trucks with a winch or the like when, for example, the operator wants to move from one side of the vehicle to the other side for controlling the load to be lifted.

For inserting the operating part, the switch 25 of the functional component 9 is pressed down, the link 28 is removed, and the operating part 7b is inserted. The override switch 25 can now be released; the hardware emergency stop circuit 14 is active by means of the mechanical emergency stop switch 15 of the operating part 7b.

When switching on the operating part 7b, the monitoring unit 22 reacts and opens the switch 24 so that at the pin 23 the digital signal "0" is present; this is recognized by the control unit 1 as "operating part switched on". The heartbeat that is now being sent again by the operating part 7b or its terminal circuit board 37, 37b is again evaluated by the system so that in the case of an unscheduled absence of the heartbeat the control unit can be moved into safe mode.

The specification incorporates by reference the entire disclosure of European priority document 06 018 624.4 having a filing date of 6 Sep. 2006.

While specific embodiments of the invention have been shown and described in detail to illustrate the inventive principles, it will be understood that the invention may be embodied otherwise without departing from such principles.

What is claimed is:

1. A control device for operating a machine, the control device comprising:
   actuators and/or sensors for controlling the machine in operation;
   a control unit comprising at least one actuating unit, wherein the actuators and/or sensors are connected to the at least one actuating unit;
   at least one operating part;
   a first connection means located at a first location within the control device and a second connection means located at a second location within the control device, wherein the at least one operating part is connected by the first connection means or the second connections means to the control unit;
   wherein the control unit comprises a bus line for transmitting control commands from the at least one operating part to the at least one actuating unit;
   a monitoring unit for an operating signal of the at least one operating part, wherein the monitoring unit triggers a safety function when the operating signal is absent;
   wherein the operating signal is the heartbeat of the at least one operating part;
   wherein the monitoring unit monitors an operating state of the at least one operating part and emits a first output signal when the at least one operating part is switched on and a second output signal when the at least one operating part is switched off;
   wherein the first and second output signals of the monitoring unit are evaluated such that, when the at least one operating part is switched on, the heartbeat is processed and, when the at least one operating part is switched off, the absence of the heartbeat is ignored.

2. The control device according to claim 1, wherein the monitoring unit monitors a current supplied to the at least one operating part.

3. The control device according to claim 2, wherein the monitoring unit sends the first output signal when the current surpasses a threshold value and the second output signal when the current drops below the threshold value.

4. The control device according to claim 3, wherein the second output signal is an active signal.

5. The control device according to claim 3, wherein the second output signal is a digital voltage signal.

6. The control device according to claim 1, wherein the at least one operating part has at least one terminal circuit board as an interface between operating elements of the at least one operating part and the bus line.

7. The control device according to claim 6, wherein the heartbeat is a heartbeat signal of the at least one terminal circuit board.

8. The control device according to claim 1, wherein the at least one operating part and the at least one actuating unit are integrated into a common hardware emergency stop circuit.

9. The control device according to claim 1, wherein the at least one operating part and all of the at least one actuating unit are integrated into a common software emergency stop circuit.

10. The control device according to claim 1, further comprising a functional component, wherein the at least one operating part is connected through the functional component to the control unit.

11. The control device according to claim 10, wherein the at least one operating part is connected through the functional component to at least one of the bus line of the control unit and/or a common hardware emergency stop circuit of the control unit.

12. The control device according to claim 11, wherein the functional component is connected by a first plug connection to the control unit, a voltage supply and the hardware emergency stop circuit, and is connected by a second plug connection to the at least one operating part.

13. The control device according to claim 12, wherein the second plug connection comprises a positive-locking quick coupling.

14. The control device according to claim 10, wherein the monitoring unit is incorporated into the functional component.

15. The control device according to claim 10, wherein the functional component comprises an override switch for overriding an emergency stop switch of the at least one operating part.

16. The control device according to claim 15, wherein the override switch is monitored and wherein an actuation of the override switch is signaled to the control unit.

17. The control device according to claim 16, wherein the actuation of the override switch is signaled to the control unit through the bus line.

18. The control device according to claim 16, comprising a timing element that is actuated when the override switch is actuated, wherein, when the timing element stops, a software emergency stop is triggered.

19. The control device according to claim 1, wherein the bus line is a CAN (controller area network) bus.

20. The control device according to claim 1, wherein the bus line is a CANopen (controller area network open) bus.

* * * * *